US006709992B1

(12) United States Patent
Swift et al.

(10) Patent No.: US 6,709,992 B1
(45) Date of Patent: Mar. 23, 2004

(54) SMOOTH SURFACE TRANSFUSE BELTS AND PROCESS FOR PREPARING SAME

(75) Inventors: Joseph A. Swift, Ontario, NY (US); Donald Stanton, Penfield, NY (US)

(73) Assignee: Xerox, Stamford, CT (US)

( * ) Notice: Subject to any disclaimer, the term of this patent is extended or adjusted under 35 U.S.C. 154(b) by 87 days.

(21) Appl. No.: 09/698,413

(22) Filed: Oct. 30, 2000

(51) Int. Cl.[7] ................................................ B32B 27/04

(52) U.S. Cl. ........................... 442/66; 442/64; 442/155; 442/157; 428/447; 428/448; 428/451; 139/383 R; 399/307; 399/329; 399/333; 433/81

(58) Field of Search ............................ 442/64, 66, 155, 442/157; 428/447, 448, 451; 139/383 R; 399/307, 329, 333

(56) References Cited

U.S. PATENT DOCUMENTS 5,434,657 A 7/1995 Berkes et al. ............... 399/308
5,459,008 A 10/1995 Chambers et al. .......... 430/126
5,922,440 A 7/1999 Schlueter, Jr. et al. ...... 428/195
5,991,590 A 11/1999 Chang et al. ............... 399/302

*Primary Examiner*—Terrel Morris
*Assistant Examiner*—John J. Guarriello
(74) *Attorney, Agent, or Firm*—Perman & Green, LLP

(57) ABSTRACT

Process for preparing durable, re-usable intermediate toner image-transfer belts or electrostatic transfuse belts. The present belts have a continuous elastomer-impregnated fibrous fabric support and at least one outer smooth release layer of a cured elastomer polymer. The invention is characterized by the application of a thin primer layer of a hydrolyzable polyfunctional silicone composition between the elastomer-coated surface of the fabric support and the outer elastomer polymer layer. The polyfunctional silicone chemically-bonds to the elastomer of the fabric support during hydrolysis and chemically-bonds to the outer elastomer layer during its cure, to form a durable, heat-resistant transfuse belt. The layers maybe applied to the fabric support by spray application as dilute solutions.

6 Claims, 2 Drawing Sheets

SMOOTH SURFACE TRANSFUSE BELTS AND PROCESS FOR PREPARING SAME

BACKGROUND OF THE INVENTION

1. Field of the Invention

Figure 1:
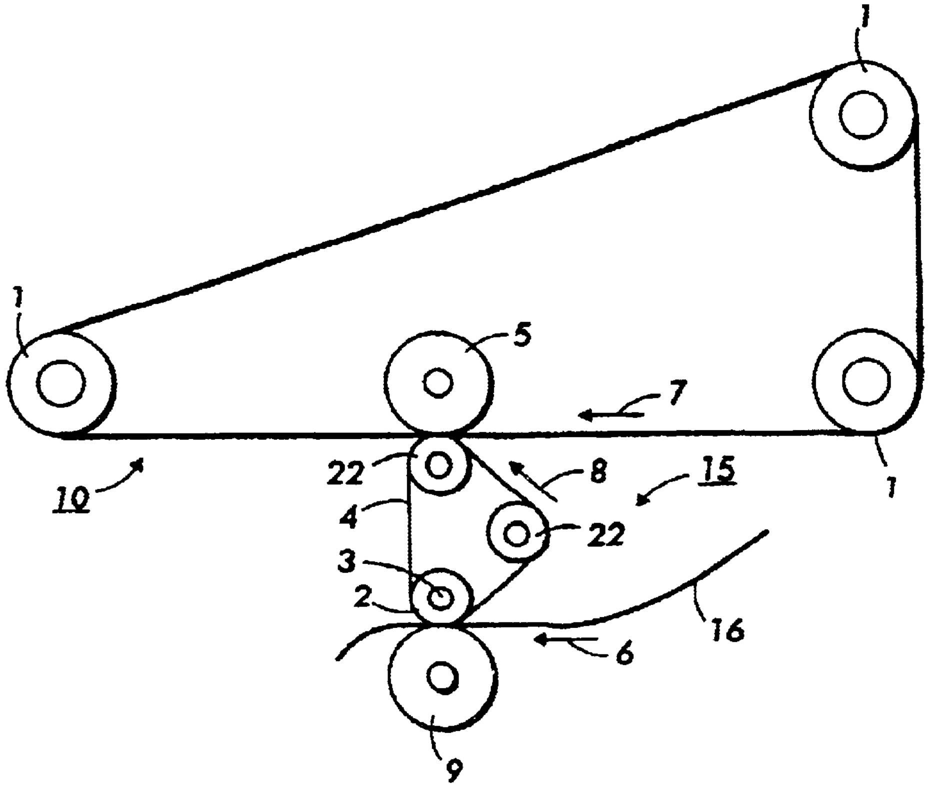

The present invention relates to novel electrostatic transfuse belts, or intermediate transfer belts, for receiving toner images from a photoreceptor toner image forming member and transfusing said images to a copy member such as a paper copy sheet to form fixed images thereon.

2. State of the Art

Electrostatographic printing machines such as photocopiers, laser printers, facsimile machines and the like incorporating intermediate transfuse systems and belts are well known in the art, as illustrated by embodiments of U.S. Pat. Nos. 5,922,440; 5,991,590; 5,434,657 and 5,459,008, for example. Transfuse systems and copy machines incorporate an intermediate continuous belt having a surface which is receptive to the electrostatic transfer of toner images from a photoreceptor belt or drum, generally by applying a charge to the intermediate belt which is opposite to the charge of the toner images. The toner-imaged intermediate transfuse belt is then continuously cycled through the pressure nip between a heated roller and a pressure roller, in surface contact with a copy sheet whereby the toner images are heat-fused to the surface of the copy sheet and transferred from the surface of the transfuse belt when the belt and copy sheet exit the pressure nip.

In electrostatographic printing machines in which the toner image is transferred from the intermediate transfer member to the image receiving substrate, it is important that the transfer of the toner particles from the intermediate transfer member to the image receiving substrate be substantially 100 percent. Less than complete transfer to the image receiving substrate results in image degradation and low resolution. Completely efficient transfer is particularly important when the imaging process involves generating full color images since undesirable color deterioration in the final colors can occur when the color images are not completely transferred from the intermediate transfer member.

Thus, it is important that the intermediate transfer member surface has excellent release characteristics with respect to the toner particles. Conventional materials known in the art for use as intermediate transfer members often possess the strength, conformability and electrical conductivity necessary for use as intermediate transfer members, but can suffer from poor toner release characteristics, especially with respect to higher gloss image receiving substrates, and poor adhesion to the substrate, particularly under the effects of heat.

Although continuous application of a liquid release agent to the belt surface increases toner transfer, the transfer member outer layer can swell upon repeated addition of the release agents. For example, it has been shown that silicon rubber performs well as a transfer layer, but swells significantly in the presence of hydrocarbon fluid release agents and loses adhesion to the support belt, particularly when heated. Also, release properties have been shown to decay from repeated interaction with certain release agents such as hydrocarbon release agents.

U.S. Pat. No. 5,459,008 discloses an intermediate transfer member in combination with a thin film coating of a release agent material comprising a polyolefin, a silicon polymer, or grafts of these polymers, and mixtures thereof.

U.S. Pat. No. 5,922,440 discloses an intermediate toner-transfer belt having a polyimide film support, an adhesive binder layer or prime coat, a polymer layer such as a fluoropolymer, polyimide or silicone rubber, and an outer release layer of a similar polymer. While the optional adhesive binder layer provides some degree of improved mechanical adhesion to the polyimide film substrate, the mechanical adhesion to the belt support and/or to the polymer layer is subject to failure after repeated use in the transfusion transfer process whereby the useful life of the belt is reduced.

A need remains for an intermediate transfer member that exhibits substantially 100 percent toner fusion and transfer, without system failure, to image receiving substrates having glosses ranging from low to very high, over a prolonged life of use at elevated temperatures without delamination and breakdown. Further, a need remains for a combination of a transfer member surface layer and a release agent that does not result in significant swelling and separation of the outer layer of the transfer member. In addition, it is desired to present a transfusion belt in which the transfer properties of the belt do not significantly decay or degrade over repeated reuse at elevated temperatures.

Finally, it is desirable that the release surface of the transfusion belt remains smooth and glossy after repeated reuse in order to continue to produce 100% transfer of the toner images and the formation of copy images which have glossy surfaces and have a pleasing appearance over the lifespan of the belt.

SUMMARY OF THE INVENTION

The present invention relates to an improved reusable intermediate transfuse belt for use in the electrostatic process of forming toner images thereon and heating sufficiently to fuse the images and transfer them as glossy-surfaced images to a copy sheet in contact therewith, which belt is resistant to heat-degradation and delamination over an extended life of repeated reuse.

The novel transfuse belts of the present invention have an elastomer-coated, continuous seamless fabric belt support and a conformable release layer of an elastomer polymer having a smooth glossy surface, characterized by the presence of an intermediate hydrolyzed polyfunctional moisture-cured silicone primer layer which is chemically-bonded to both the elastomer-coated belt support and to the elastomer release layer present thereon to prevent any separation or delamination of the elastomer release layer over prolonged reuse of the transfuse belt at elevated fusion temperatures up to at least about 200° C.

THE DRAWINGS

Figure 2:
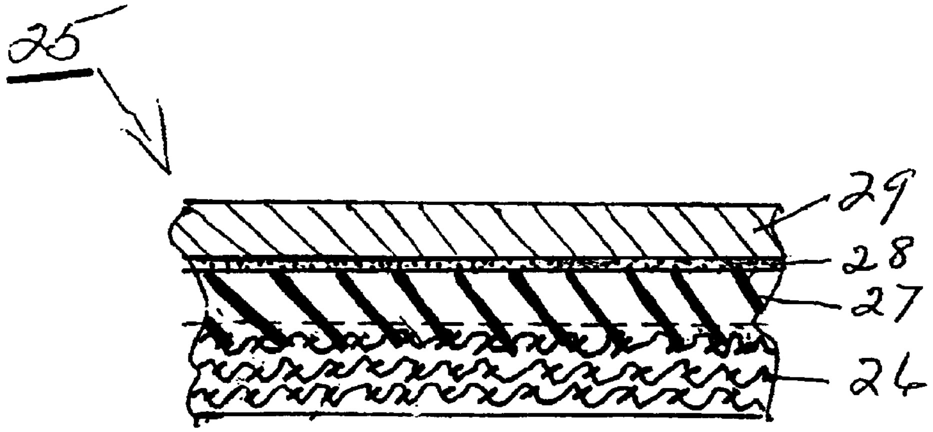

In the accompanying drawings:

FIG. 1 is a schematic view of an image development apparatus incorporating an intermediate transfuse belt according to the present invention, and FIG. 2 is a cross-sectional view of a transfuse belt according to an embodiment of the present invention.

DETAILED DESCRIPTION

The novel transfuse belts of the present invention comprise a conventional elastomer-integrated fiber fabric support since such supports have exceptional strength and resistance to elongation even when heated to the elevated temperatures of the electrostatographic toner-transfusion copying process which range up to about 200° C. The present transfuse belts support a conventional conformable release layer of an elastomer polymer and are characterized by the use of an intermediate chemical bonding layer of a polyfunctional primer material which is reactive with the elastomeric material which is integrated, penetrated or impregnated into the fibrous support, and is also reactive with the elastomer of the conformable top layer to form a chemical bond between the top layer and the fabric belt support.

Fabric materials are made from fibers or threads and woven, knitted or pressed into a cloth or felt type structure. Woven, as used herein, refers to fabrics of fibers closely oriented by warp and filler strands at right angles to each other. Nonwoven, as used herein, refers to randomly integrated fibers or filaments. The fabric material useful as the substrate herein must be suitable for allowing a high operating temperature (i.e., greater than about 180° C., preferable greater than 200° C.), capable of exhibiting high mechanical strength, providing heat insulating properties (this, in turn, improves the thermal efficiency of the proposed fusing system), and possessing electrical insulating properties. In addition, it is preferred that the fabric substrate have a flexural strength of from about 200,000 to about 3,000,000 psi, and a flexural modulus of from about 25,000 to about 55,000 psi. Examples of suitable fabrics include woven or nonwoven cotton fabric, wool fabric, carbon fiber fabric, graphite fabric, fiberglass, woven or nonwoven polyimide (for example KELVAR® available from DuPont), woven or nonwoven polyamide, such as nylon or polyphenylene isophthalamide (for example, NOMEX® of E.I.

DuPont of Wilmington, Del.), polyester, polycarbonate, polyacryl, polystyrene, polyethylene, polypropylene, co-polymers of the above, with and without reinforcing filters, and the like.

In an electrostatographic printing machine, each image being transferred is formed on an imaging member. The imaging member can take conventional forms such as a photoreceptor belt or drum, an ionographic belt or drum, and the like. The image may then be developed by contacting the latent image with a toner or developer at a developing station. The development system can be either wet or dry. The developed image is then transferred to an intermediate transfer member. The image can be either a single image or a multi-image. In a multi-image system, each of the images may be formed on the imaging member and developed sequentially and then transferred to the intermediate transfer member, or in an alternative method, each image may be formed on the imaging member, developed, and transferred in registration to the intermediate transfer member.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, a photoreceptor is charged on its surface by means of a charger to which a voltage has been supplied from a power supply. The photoreceptor is then imagewise exposed to light from an optical system or an image input apparatus, such as a laser and light emitting diode, to form an electrostatic latent image thereon. Generally, the elctrostatic latent image is developed by bringing a developer mixture from a developer station into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to an intermediate transfer member, or bias transfer member, and subsequently transferred to and heat fused on a copy sheet. Examples of copy substrates include paper, transparency material such as polyester, polycarbonate, or the like, cloth, wood, metal, or any other desired material upon which the finished image will be situated.

Transfer and fusing occur simultaneously in a transfix configuration. As shown in FIG. 1, a transfer apparatus is depicted as transfix belt 4 being held in position by driver rollers 22 and heated roller 2. Heated roller 2 comprises a heater element 3. Transfix belt 4 is driven by driving rollers 22 in the direction of arrow 8. The developed image from photoreceptor 10, which is driven in direction 7 by rollers 1, is transferred to transfix belt 4 when contact with photoreceptor 10 and belt 4 occurs. Pressure roller 5 aids in transfer of the developed image from photoreceptor 10 to transfix belt 4. The transferred image is subsequently transferred to copy substrate 16 and simultaneously fixed to copy substrate 16 by passing the copy substrate 16 between belt 4 (containing the developed image) and pressure roller 9. A nip is formed by heated roller 2 with heating element 3 contained therein and pressure roller 9. Copy substrate 16 passes through the nip formed by heated roller 2 and pressure roller 9, and simultaneous transfer and fusing of the developed image to the copy substrate 16 occurs. In some cases it may be necessary, optionally, to cool the belt 4 before it re-contacts the photoreceptor 10 by an appropriate mechanism pre-disposed between rollers 22.

FIG. 2 illustrates a length of the present transfuse belt 25, comprising a fibrous fabric support 26, an integrated elastomeric surface layer 27, a chemically-bonded primer layer 28 and an elastomeric top release layer 29 which is also chemically bonded to the primer layer 28.

The essential primer layer 28 is a continuous, thin layer or coating of a polyfunctional, hydrolyzable, moisturecurable silane or siloxane which is applied from dilute solution and allowed to hydrolyze and chemically-bond to the surface of the elastomer layer 27 which is integrated into the surface of the fabric support 26. A preferred primer material is 3-amino triethoxysilane. While the primer layer may be effective in a non-continuous layer, the continuous layer is preferred.

Preferred elastomer materials for the outer conformable layer 29 include relatively low surface energy elastomeric polymers, preferably fluroelastomers such as those sold under the tradename VITON® such as copolymers and terpolymers of vinylidenefluoride, hexafluoropropylene and tetrafluoroethylene, which are known commercially under various designations as VITON A®, VITON E® VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Preferred known fluoroelastomers are (1) a class of copolymers of vinylidenefluoride, hexafluoropropylene and tetrafluoroethylene, known commercialy as VITON A®, (2) a class of terpolymers of vinylidenefluroide, hexafluoropropylene and tetrafluoroethylene known commercially as VITON B®, and (3) a class of tetrapolymers of vinylidenefluroide, hexafluoropropylene, tetraf luoroethylene and a cure site monomer. VITON A®, and VITON B®, and other VITON® designations are trademarks of E.I. DuPont de Nemours and Company. In another preferred embodiment, the fluoroelastomer is a tetrapolymer having a relatively low quantity of vinylidenefluoride. An example is VITON GF®, available from E.I. Dupont de Nemours, Inc. The VITON GF® has 35 mole percent of vinylidenefluoride, 34 mole percent of hexafluoropropylene and 29 mole percent of tetrafluoroethylene with 2 percent cure site monomer. The cure site monomer can be those available from DuPont such as 4-bromoperfluorobutene-1, 1,1-dihydro-4-bromoperfluorobutene-1,3-bromoperfluoropropene-1,1,1-dihydro-3-bromoperfluoropropene-1, or any other suitable, known, commercially available cure site monomer.

The outer conformable layer is coated on the primer-coated substrate in any suitable known manner. Typical techniques for coating such materials on the reinforcing member include liquid and dry powder spray coating, dip coating, wire wound rod coating, fluidized bed coating, powder coating, electrostatic spraying, sonic spraying, blade coating, molding, laminating, and the like. It is preferred to spray or flow coat the outer material when the thickness desired is about 25 to about 125 $\mu$m.

The elastomer support coating 27, of natural or synthetic rubber, preferably includes electrically conductive particles dispersed in the coating. These electrically conductive particles decrease the resistivity of the support fabric belt 26 into the desired surface resistivity range of from about $10^2$ to less than about $10^4$, preferably from about $10^6$ to about $10^{13}$, and more preferably from about loll to about $10^{12}$ ohms-sq. The desired volume resistivity is from about $10^5$ to about $10^{13}$, preferably from about $10^7$ to about $10^{11}$ ohm-cm. The desired resistivity can be provided by varying the concentration of the conductive filler. It is important to have the resistivity within this desired range. The transfuse belt 25 will exhibit undesirable effects if the resistivity is not within the required range, including nonconformance at the contact nip, poor toner releasing properties resulting in copy contamination, and generation of contaminant during charging. Other problems include resistivity that is susceptible to changes in temperature, relative humidity, running time, and leaching out of contamination to photoconductors. The substrate material 26/27 and the conforming layer material 29 preferably possess the desired resistivity enabling a field to be created for transfer, and discharge of the field before the next imaging cycle. The field created preferably is able to transfer dry toner or liquid ink from one substrate to another. Further, the preferred outer layer is preferably thin enough to create and dissipate a field, yet insulative enough to prevent electrical shorts from pin holes in transferring substrates. It is desired that the outer layer 29 of the transfer or transfix belt 25 has a resistivity falling within the ranges disclosed above.

In a preferred embodiment, a release agent is used in combination with the intermediate transfer member or transfix member 25. Particularly preferred release agents are aqueous silicone polymer release agents such as aqueous polydimethyl siloxane, fluorosilicone, fluoropolymers, and the like. In a particularly preferred embodiment, the release agent is polydimethyl siloxane release agent that is a liquid emulsion instead of oil-based or wax-based, and comprises cationic electrical control agents or metallic end group polymers to impart cationic electrical conductivity. Examples of commercially available silicone release agents include GE Silicone SM2167 Antistat®, General Electric SF1023, DF1040, SF1147, SF1265, SF1706, SF18-350, SF96, SM2013, SM2145, SF1154, SM3030, DF104, SF1921, SF1925, SF69, SM2101, SM2658, SF1173, SF1202 and SF1204.

The release agent material may or may not comprise conductive fillers for antistatic properties. Suitable conductive fillers include carbon black; graphite; boron nitride; metal oxides such as copper oxide, zinc oxide, titanium dioxide, silicone dioxide, and the like, and mixtures thereof. If a filler is present in the release agent material, it is preferably present in an amount of from about 0.5 to about 40 percent, preferably from about 0.5 to about 15 percent by weight of total solids.

The release agent is applied to the transfer member as a relatively thin outer coating layer prior to transfer of the developer material or toner images. Preferably, the release agent is applied to the transfer member by a wick, roller, or other known application member. The release agent is supplied in an amount of from about 0.01 to about 15 $\mu$l/copy, preferably from about 0.1 to about 2 $\mu$l/copy, as a thin film covering the outer layer of the transfer member.

The following example illustrates the preparation of a transfuse belt according to a preferred embodiment.

EXAMPLE

A conventional, commercially-available fuser belt support is used, consisting of a fibrous fabric endless belt which is impregnated with a synthetic elastomer, cured and ground to a fine finish surface layer of the desired thickness. The surface is washed with a suitable solvent on a cotton pad to remove contaminants, and is air-dried while mounted on a rotatable mandril within a spray booth.

A primer composition is sprayed in two passes over the elastomer surface of the fabric belt, comprising a tetrahydroxyalkyl silane, followed by air hydrolysis for a period of 72 hours during which the silane chemically bonds to the surface of the elastomer.

Next a curable elastomeric polymer layer is sprayed over the primer layer in two applications, the first application containing conductive carbon to form a layer which drains any static charge produced during high-speed operation of the belt, and the second application forming the smooth surface top release layer.

The first application spray composition preferably comprises 400 gms of a dispersion of 70 gms Viton GF and 2.8 gms of conductive carbon in 680 gms of methylisobutyl ketone, mixed with 360 gms of methylisobutyl ketone, 30 gms of NMP (N-methyl pyrrolidone) and 0.36 gms of A0700 (curing agent). In order to assure a uniform layer, the composition is sprayed onto the primer layer in several passes, with 30 second intervals between passes, then dried at room temperature for 1 or more hours, then cured at 230° for 16 hours.

It should be understood that the above description is merely illustrative of the invention. Various alternatives and modifications can be devised by those skilled in the art without departing from this invention. Accordingly, the present invention is intended to embrace all such alternatives, modifications and variances which fall within the scope of the appended claims.

What is claimed:

1. A continuous, intermediate belt for receiving heat-fusible toner images from a photoreceptor surface and for simultaneously fusing and completely transferring said images to a copy sheet as glossy-surface images, said belt comprising:

(a) a continuous support of fibrous fabric material having on at least the outer surface thereof a thin layer of elastomeric composition which impregnates, penetrates and anchors to said fibrous fabric material;

(b) a thin primer layer of a polyfunctional silicone composition applied to said elastomeric layer and hydrolyzed to form a chemical bond between said elastomeric layer and the hydrolyzed silicone composition, (c) a thin outer layer of a heat-curable elastomer polymer applied to said hydrolyzed silicone primer layer and heat-cured to form a dry outer surface layer bonded to said primer layer, and having a smooth release surface for said heat fusible toner images.

2. A continuous intermediate belt according to claim 1 in which said support of fibrous fabric comprises a woven fabric having high heat-resistance and mechanical strength.

3. A continuous intermediate belt according to claim 1 in which said elastomeric composition impregnated into said support comprises a synthetic rubber.

4. A continuous intermediate belt according to claim 1 in which said primer layer comprises 3-amino triethoxysilane.

5. A continuous intermediate belt according to claim 1 in which said elastomer polymer comprises a vinylidene fluoride polymer.

6. A continuous intermediate belt according to claim 5 in which said elastomer polymer is a tetrapolymer of vinylidene fluoride, hexafluoropropylene, tetrafluoroethylene and a cure site monomer.

* * * * *